us009077468B2

(12) United States Patent
Chen

(10) Patent No.: US 9,077,468 B2
(45) Date of Patent: Jul. 7, 2015

(54) METHODS AND APPARATUS FOR COMMUNICATION SYNCHRONIZATION

(75) Inventor: David Chen, Wilmette, IL (US)

(73) Assignee: Nokia Solutions and Networks Oy, Espoo (FI)

(*) Notice: Subject to any disclaimer, the term of this patent is extended or adjusted under 35 U.S.C. 154(b) by 21 days.

(21) Appl. No.: 13/329,475

(22) Filed: Dec. 19, 2011

(65) Prior Publication Data
US 2013/0155945 A1 Jun. 20, 2013

(51) Int. Cl.
H04J 3/06 (2006.01)
H04W 92/20 (2009.01)

(52) U.S. Cl.
CPC .............. H04J 3/0661 (2013.01); H04W 92/20 (2013.01); H04J 3/0667 (2013.01)

(58) Field of Classification Search
None
See application file for complete search history.

(56) References Cited

U.S. PATENT DOCUMENTS

| 5,553,069 | A * | 9/1996 | Ueno et al. ..................... 370/315 |
| 2009/0013330 | A1 * | 1/2009 | Gotz et al. ..................... 719/313 |
| 2010/0118837 | A1 | 5/2010 | Bracha |
| 2011/0255528 | A1 * | 10/2011 | Zakrzewski ................... 370/350 |
| 2012/0082156 | A1 * | 4/2012 | Swartzentruber et al. .... 370/389 |

FOREIGN PATENT DOCUMENTS

| EP | 2058966 A1 | 5/2009 |
| WO | WO-03086003 A1 | 10/2003 |
| WO | WO-2009/008681 A2 | 1/2009 |
| WO | WO 2011050844 A1 * | 5/2011 ................ H04J 3/06 |

OTHER PUBLICATIONS

Aneeq Mahmood & Georg Gaderer, Timestamping for IEEE 1588 based Clock Synchronization in Wireless LAN, International Symposium on Precision Clock Synchronization for Measurement, Control and Communication at 63, 63-68 (Oct. 12-16, 2009).*
"Timestamping for IEEE 1588 based Clock Synchronization in Wireless LAN", Aneeq Mahmood et al., IEEE 2009, pp. 63-68.
"Best practices for implementing IEEE-1588 in Wireless Backhaul", Technical Brief, CERAGON, 10 pgs.
"Network Time Protocol Version 4 Protocol and Algorithms Specification draft-ietf-ntp-ntpv4-proto-13", J. Burbank et al., RFC 4330, RFC 1305, Oct. 9, 2009, 112 pgs.
"IEEE 1588 Style Synchronizaton Over a Wireless Link", Hamza Abubakari, Dec. 2008, 78 pgs.
"IEEE Standard for a Precision Clock Synchronization Protocol for Networked Measurement and Control Systems", IEEE Instrumentation and Measurement Society, IEEE Std 1588™, 2008, 287 pgs.
"IEEE P1588™ D2.2 Draft Standard for a Precision Clock Synchronization Protocol for Networked Measurement and Control Systems", Precise Networked Clock Synchronization Working Group of the IM/ST Committee, IEEE 2008, 299 pgs.

* cited by examiner

Primary Examiner — Ian N Moore
Assistant Examiner — Brian T Le
(74) Attorney, Agent, or Firm — Harrington & Smith

(57) ABSTRACT

Systems and techniques for delivering timing over packet (ToP) data over a wireless hop. Timing information is synchronized between a master and a slave node of a wireless hop. When a ToP packet arrives at the master node, an arrival time of the packet at an ingress point of the master node is noted and stored as a timestamp. The packet is transmitted over a wireless link to the slave node. The packet makes its way to an egress point of the slave node, and the residence time of the packet in the wireless link is calculated and stored. The residence time of the packet is the time between the packet's arrival at the ingress point of the master and the egress point of the slave. The packet is then transmitted out of the egress point of the slave.

11 Claims, 3 Drawing Sheets

METHODS AND APPARATUS FOR COMMUNICATION SYNCHRONIZATION

FIELD OF THE INVENTION

The present invention relates generally to wireless communication. More particularly, the invention relates to systems and techniques for improved synchronization for wireless data communications

BACKGROUND

One of the greatest problems facing wireless network operators is the need to serve large numbers of customers with varying needs using the infrastructure available to them. Historically, a wireless network deployment supported a cell encompassing a relatively large geographic area, with a large base station located in a central area serving user devices distributed through the cell. A cell was historically dedicated to the user devices within its geographic area, with all user devices attached to the cell being served by that base station.

Recent years have brought changes to this historical picture of wireless network deployments. Many small deployments are being created, with smaller base stations serving smaller geographic areas, and with still smaller base stations serving areas that may be, for example, an apartment building a portion of a city block, or even smaller areas. Base stations serving such areas may lie in the same geographic area as that encompassed by a traditional base station, and may serve selected sets of users who may include users separate from those served by those served by the traditional base station or may include a portion of users served by the traditional base station.

Such smaller base stations are naturally easier to deploy in varied locations, and may also be provided at lower cost. Achieving such adaptable and lower cost deployment while meeting performance requirements introduces a number of challenges. In particular, current wireless networking standards, such as 3GPP LTE, or Third Generation Partnership Project-Long Term Evolution, require frequency and phase synchronization. There are a number of techniques for achieving such synchronization for traditional larger base stations, but these techniques may be more difficult to use for the wide variety of smaller base stations that are becoming available.

SUMMARY OF THE INVENTION

In one embodiment of the invention, an apparatus comprises at least one processor and a computer readable memory storing a program of instructions. The program of instructions is configured to, with the memory and the at least one processor, cause the apparatus to perform actions comprising at least exchanging timing information with a device with which the apparatus communicates over a wireless link. The timing information is exchanged over a synchronization channel with the device. The timing information allows timing synchronization for the apparatus and the device. The actions further comprise, upon receiving a timing-over-packet packet, storing a timestamp indicating an arrival time of the packet at an ingress point of the apparatus and transmitting the packet to the device over the wireless link.

In another embodiment, the invention comprises at least one processor and a computer readable memory storing a program of instructions. The program of instructions is configured to, with the memory and the at least one processor, cause the apparatus to perform actions comprising at least exchanging timing information with a device with which the apparatus communicates over a wireless link, wherein the timing information is exchanged over a synchronization channel with the device and wherein the timing information allows timing synchronization for the apparatus and the device, and upon receiving a timing-over-packet packet from the device, passing the packet to an egress point of the apparatus. The actions further comprise calculating a residence time of the packet in the wireless link, wherein the residence time represents a difference between a time represented by a timestamp of the packet and a time shown by a clock of the apparatus when the packet reaches the egress point of the apparatus, wherein the timestamp represents an arrival time of the packet at an ingress point of the device. The actions further comprise replacing the timestamp of the packet with the residence time of the packet and transmitting the packet out the egress point of the device.

In another embodiment, the invention comprises a method. The method comprises configuring at least one processor to cause an apparatus to perform actions comprising at least exchanging timing information with a device with which the apparatus communicates over a wireless link, wherein the timing information is exchanged over a synchronization channel with the device and wherein the timing information allows timing synchronization for the apparatus and the device, and upon receiving a timing-over-packet packet from the device, passing the packet to an egress point of the apparatus. The actions further comprise calculating a residence time of the packet in the wireless link, wherein the residence time represents a difference between a time represented by a timestamp of the packet and a time shown by a clock of the apparatus when the packet reaches the egress point of the apparatus, wherein the timestamp represents an arrival time of the packet at an ingress point of the device. The actions further comprise replacing the timestamp of the packet with the residence time of the packet and transmitting the packet out the egress point of the device.

In another embodiment, the invention comprises a computer readable medium storing a program of instructions. When executed by a processor, the instructions configure an apparatus to perform actions comprising at least exchanging timing information with a device with which the apparatus communicates over a wireless link, wherein the timing information is exchanged over a synchronization channel with the device and wherein the timing information allows timing synchronization for the apparatus and the device, and upon receiving a timing-over-packet packet from the device, passing the packet to an egress point of the apparatus. The actions further comprise calculating a residence time of the packet in the wireless link, wherein the residence time represents a difference between a time represented by a timestamp of the packet and a time shown by a clock of the apparatus when the packet reaches the egress point of the apparatus, wherein the timestamp represents an arrival time of the packet at an ingress point of the device. The actions further comprise replacing the timestamp of the packet with the residence time of the packet and transmitting the packet out the egress point of the device.

DETAILED DESCRIPTION

Figure 1:
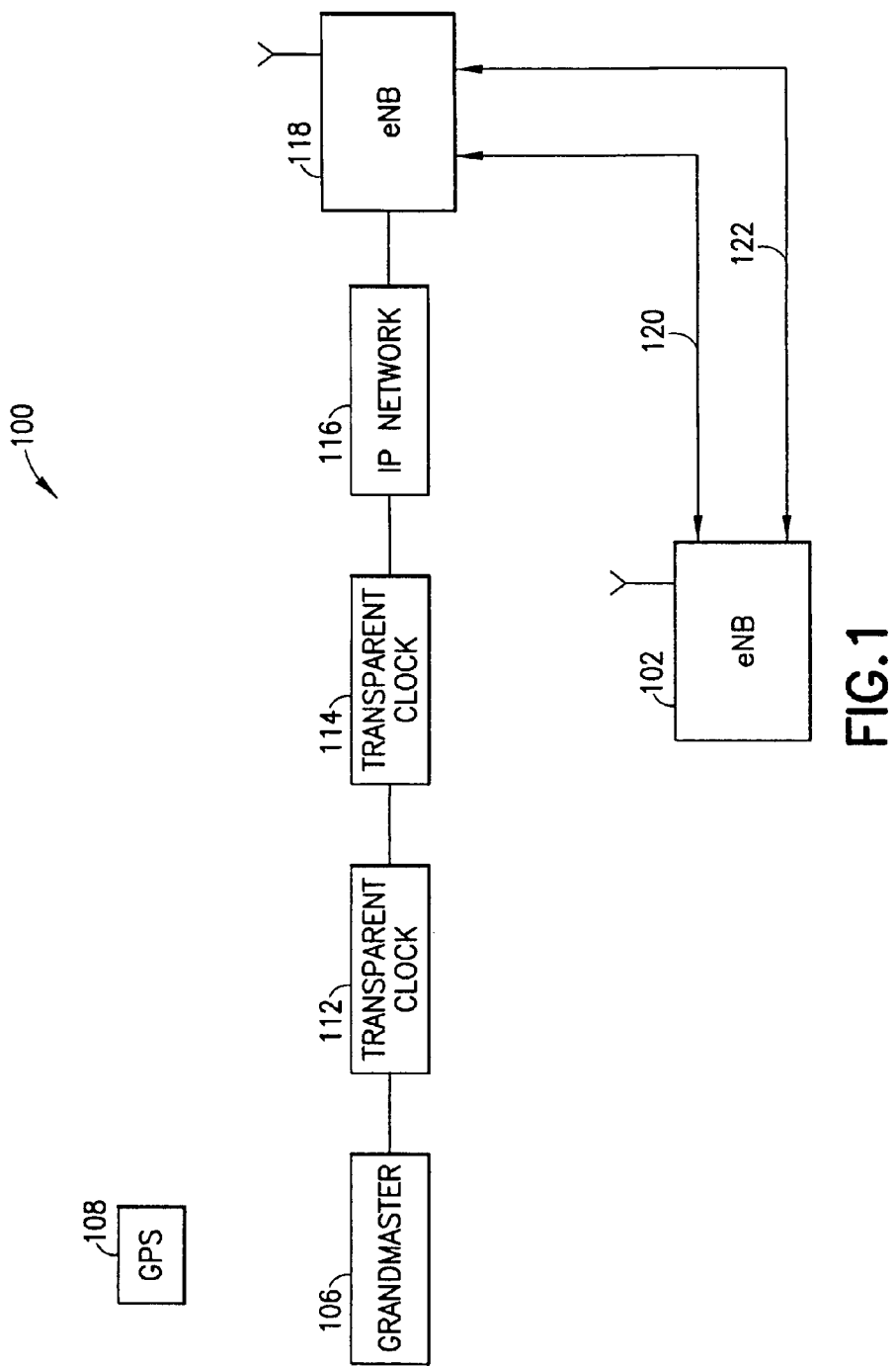
FIG. 1 illustrates a system delivering timing over packet information according to an embodiment of the present invention.

Various embodiments of the present invention recognize that traditional base stations may relatively easily achieve cellular synchronization through the use of mechanisms such as a high stability oscillator (HSO), the global positioning system (GPS), or both. However, particularly in cases of small cell deployment, such synchronization mechanisms may be unreliable or too costly. Smaller base stations may be able to be deployed in locations such as on street lights or attached to the sides of buildings, and may be deployed in such a way that they do not have a clear line of sight to a GPS satellite. HSO installations are relatively expensive and may be too costly for many smaller deployments.

One low cost and widely available mechanism for the delivery of clock information is timing over packet (ToP) synchronization, but the application of ToP synchronization to wireless hops carries significant challenges. ToP synchronization involves the distribution of clock information from a master to one or more slaves. The master generates periodic synchronization frames that provide frequency distribution. A synchronization frame is delivered to an end device that may be referred to as a slave, and a slave receives and exchanges synch frames from the master and processes information in the frames to recover frequency and phase information for the distributed clock. However, in order for this frequency and phase information to be useful, the time that a synchronization frame spends in transit to the slave must be taken into account. The time a packet spends traveling between known ingress and egress points of a node is called the residence time, and if the residence time of a packet in a channel between a master and a slave is known, timing information encoded into the packet can easily be related to the packet's arrival time at the slave.

However, in wireless applications, and particularly in small cell applications, transmission channels are frequently high in latency and jitter and may exhibit unpredictable asymmetry, and these characteristics may result in significant degradation in ToP performance.

Therefore, one or more embodiments of the present invention provide for mechanisms to compensate for the residence time for ToP packets in a wireless backhaul hop. If the residence time experienced by ToP packets over the wireless hop is measured and stored, such as be recording the residence time in a correction field, a clock at the slave node can use the knowledge of the residence time to compensate for sources of error such as packet jitter effects or packet delay variation (PDV) by filtering out the associated latency, jitter, or asymmetry over the hop. If the correction field provides accurate information as to the residence time, this information can be used to reduce the effects of packet delay variation by filtering out phenomena such as latency, jitter, and asymmetry over the hop.

A perfect transparent hop would not contribute to packet delay variation. However, embodiments of the present invention recognize that numerous technical obstacles stand in the way of implementing a perfect transparent hop over a wireless backhaul link. One obstacle is that the ends of a wireless hop are typically not time of day (ToD) synchronized. In addition, communication devices typically implement numerous queues in order to buffer, manage, and prioritize packets. Of particular concern is the final queue preceding the physical interface (PHY). It is technically very challenging to change the content of a packet when it is about to be transmitted through the physical interface. Once a correction field has been calculated and inserted into a ToP packet, the packet should be delivered to the PHY without delay.

However, in any system in which packets are regularly going out the PHY, congestion is inevitable. If a ToP packet is delivered to the PHY after a first packet has already begun transmission, the ToP packet must wait until transmission of the first packet has been completed. This is true no matter what priority is assigned to the ToP packet, because once the first byte of the first packet has been transmitted, the rest of the packet must be transmitted before another packet can be accommodated.

Delays resulting from the need to wait for currently transmitted packets cause inaccuracies that may depend on factors such as transmission rate and the largest allowable Ethernet frame size. For example, if a hop permits over the air 100 megabits per second (Mbps) PHY rates, transmission of a 1518-byte packet takes 121 microseconds.

In addition, various factors associated with a specific implementation of a wireless hop. For example, adaptive modulation and coding techniques allow for dynamic changes of bandwidth due to ratio path fading. Such fading may, for example, result from weather changes. If bandwidth is reduced in order to accommodate such fading, more traffic can be expected to accumulate in various buffers, so that additional delay of ToP packets may be expected. Such delay of ToP packets may lead to additional errors in the correction field as the actual transmission time of the packet differs from the expected transmission time assumed by the correction field.

Additional inaccuracies can result from factors such as difference in correction accuracy for different sized packets, calculation of correction field values based on an average rather than a packet-to-packet correction, the use of a fixed delay correction rather than an average or packet-to-packet correction. Another source of error is a difference in transparent hop correction in different directions, leading to asymmetry.

A transmission path may frequently consist of a number of hops, so that if a hop is not perfectly transparent, that is, if packet delay variation is not completely removed from or compensated for in the hop, the packet delay value will propagate to the next hop. The next hop and subsequent hops may introduce their own error, leading to the accumulation of packet delay variation.

FIG. 1 illustrates a portion of a wireless network 100 according to an embodiment of the present invention. The network 100 comprises a wireless networking base station. The base station may take the form of an evolved node B or eNB, and may suitably be a small cell eNB, embodied here as a pico eNB 102. The pico eNB 102 may suitably receive synch frames originating at a grandmaster 106, and may use these frames to perform its own clock setting, and, alternatively or in addition, may forward the frames to downstream elements for their use.

The grandmaster 106 receives timing information from a reliable source, such as a GPS satellite 108 and transmits ToP packets over a transmission chain having the pico eNB 102 as an element of the chain. The transmission chain may suitably comprise a plurality of devices directed toward forwarding packets along the transmission chain, with one or more of the devices suitably being implemented as transparent clocks. A transparent clock, such as the transparent clocks 112 and 114 illustrated here, adjusts a timestamp of a precision time protocol (PTP) message packet so as to compensate for the residence of the message packet within the transparent clock, that is, the time the message spends between the ingress point and the egress point of the transparent clock. A correction field of the packet is updated as each device handles the packet, and the packet is transmitted from the transparent clock 112, to the transparent clock 114, to and within an internet protocol (IP) network, 116 and to a wireless transmission point. The wireless transmission point may suitably be a high power node taking the form of a macro eNB 118, but it will be recognized that the wireless transmission point may take the form of any device appropriate for achieving a wireless connection with the pico eNB 102. When a packet arrives at the macro eNB 118, it can be expected to have an updated correction field based on a sequence of wired transmissions. The correction field will be expected to exhibit little or no inaccuracy resulted from uncompensated-for delays. The packet may be transmitted from the macro eNB 118 to the pico eNB 102 over a radio bearer channel 120. However, for the reasons noted above, it is difficult to reliably update the correction field of the packet to compensate for variations in the radio bearer channel 120.

Therefore, the macro eNB 118 and the pico eNB 102 are suitably configured to employ a synchronization channel 122 to coordinate time information between them. The synchronization channel 122 may take the form of a separate wireless channel, suitably constructed from spare bandwidth in the carrier band used for the wireless link. The channel may be configured to exhibit fixed and identical MCS (modulation and coding scheme) properties for both the uplink and the downlink direction.

Alternatively, the synchronization channel 122 may take the form of a virtual connection within the bearer channel 120. With this configuration, the virtual connection should be assigned the highest priority traffic class to assure minimal latency and jitter. Using the synch channel 122, the slave 102 may be synchronized with the master 106 to within approximately 100 ns to 200 ns of timing accuracy.

Figure 2:
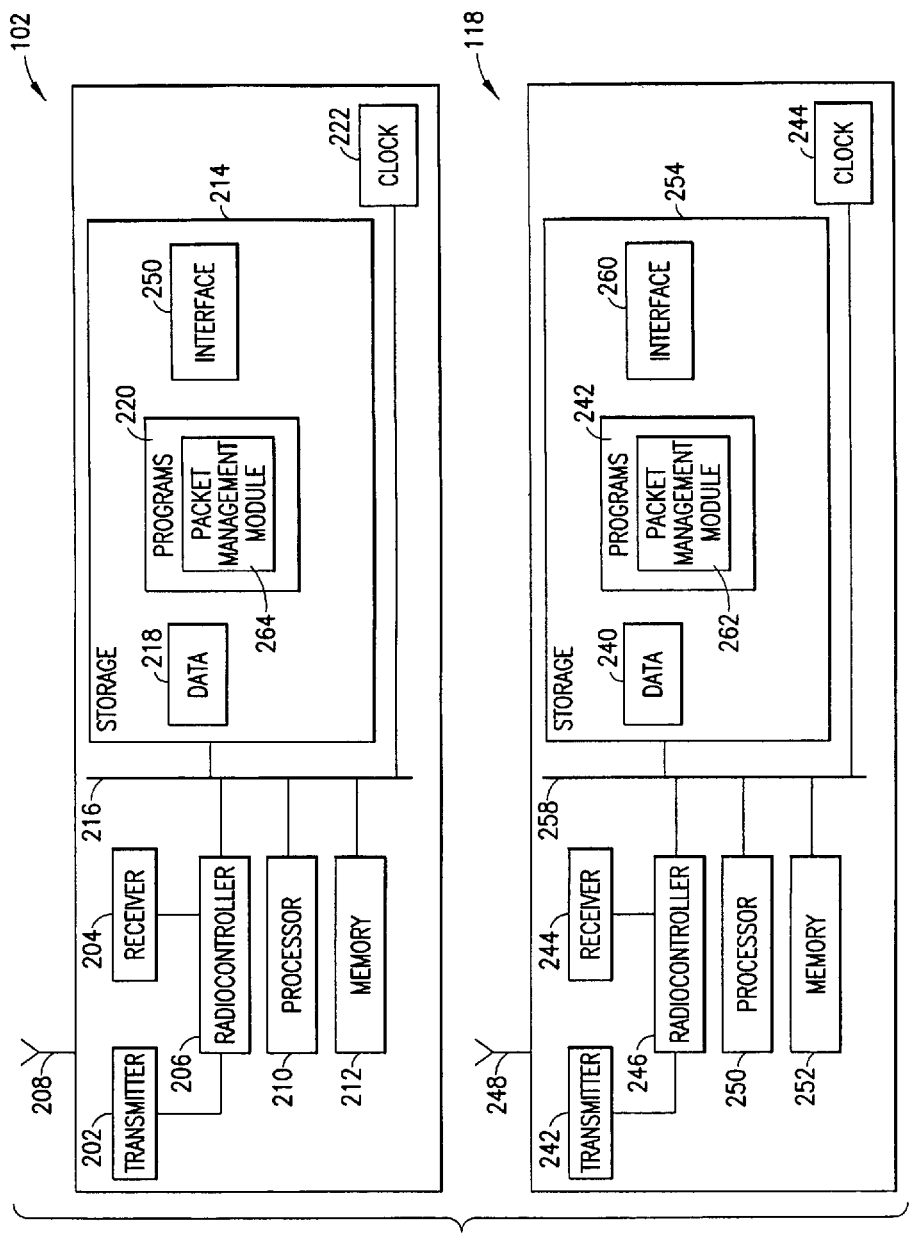
FIG. 2 illustrates exemplary wireless network elements configured to operate as elements of a transparent hop according to an embodiment of the present invention.

FIG. 2 illustrates additional details of the pico eNB 102 and the macro eNB 118. The pico eNB 102 suitably comprises a transmitter 202, receiver 204, radio controller 206, and antenna 208. The pico eNB 102 further suitably comprises a processor 210, memory 212, and storage 214, communicating with one another and with the radio controller over a bus 216. The pico eNB 102 suitably further employs data 218 and programs 220, residing in storage 214. The pico eNB 102 also suitably comprises a clock 222. The macro eNB 118 suitably comprises a transmitter 224, receiver 226, radio controller 228, and antenna 230. The macro eNB 118 further suitably comprises a processor 232, memory 234, and storage 236, communicating with one another and with the radio controller over a bus 238. The macro eNB 118 also suitably employs data 240 and programs 242, residing in storage 236. The macro eNB 118 also suitably comprises a clock 244. The pico eNB 102 and the macro eNB 118 also comprise an interface 250 and 260, respectively. Each of the interface 250 and the interface 260 comprises a plurality of communication protocol layers: specifically, the precision time protocol (PTP) layer, the user datagram protocol (UDP) layer, the internet protocol (IP) layer, the media access control (MAC) layer, the media independent interface (MII) layer, and the physical (PHY) layer. The interface 250 and 260 are shown here separately, but it will be understood that the various layers making up the interface 250 and 260 may take the form of operations using the data and programs 218, 220, 240, and 242.

The pico eNB 102 and the macro eNB 118 synchronize their clocks with one another by sharing information over the synchronization channel 122. The clocks 218 and 238 can be synchronized within approximately 100 to 200 nanoseconds (ns) of timing accuracy. The pico eNB 102 may be thought of as both a slave node to the grandmaster 106 and as a transparent hop slave node to the macro eNB 118, which may be thought of as a transparent hop master node.

The macro eNB 118 and the pico eNB 102 operate so that the residence time of a ToP packet in the wireless link between the macro eNB 118 and the pico eNB 102 is accurately reflected in the correction field of the ToP packet. When the ToP packet arrives at an ingress point of the macro eNB 118, the time of such arrival is noted and is recorded in the correction field of the ToP packet. The clocks 222 and 244 of the pico eNB 102 and the macro eNB 118, respectively, are synchronized so that the clocks 222 and 244 maintain very nearly the same time. Therefore, when the ToP packet arrives at the eNB 102, the difference between the time shown by the clock 222 and the time reflected in the correction field of the ToP packet will represent the elapsed time since the arrival of the ToP packet at the ingress point of the macro eNB 118.

When a ToP packet arrives at the macro eNB 118, the packet travels through the communication interface through the various layers to the physical layer PHY. The macro eNB 118 may suitably maintain a packet management module 262, implemented as part of the programs 242. The packet management module 262 notes the time the packet arrived at the ingress point between the media independent interface layer and the physical layer and then calculates the checksum of the packet. If the checksum operation passes, the timestamp reflecting the time of the packet's arrival at the ingress point is inserted into the ToP packet's correction field. The checksum is recalculated. The checksum needs to be recalculated because any modification to the packet will invalidate the previously calculated checksum.

It is important to note that at this point, and during all subsequent operations carried out with respect to the ToP packet, the ToP packet's correction field shows an accurate timestamp reflecting the packet's arrival at the ingress point, and both the clock 222 and the clock 244 reflect nearly the same elapsed time with respect to the timestamp. Therefore, the difference between the timestamp shown in the correction field of the packet and the time reading of either the clock 222 or the clock 244 will show the elapsed time since the event whose time is reflected in the timestamp. In the present exemplary case, this event is the arrival of the packet at the ingress point of the eNB 118.

At some point after the insertion of the timestamp into the packet, the packet is transmitted to the eNB 102 over the radio bearer channel 120. At some point after the transmission, the packet arrives at the eNB 102. Exactly when is not important, because an accurate starting time has been recorded and an accurate elapsed time is being maintained using a clock that is synchronized with the clock that showed the recorded starting time.

The eNB 102 may implement a packet management module 264, suitably implemented as part of the programs 220. When the ToP packet is received at the eNB 102, the packet management module 264 suitably examines the checksum of the received packet. If the checksum operation passes, the packet management module 264 calculates the residence time of the packet in the wireless hop. This is done by taking the difference between the current time shown by the clock 222 and the value of the timestamp stored in the ToP packet's correction field. Just before the packet is forwarded out through the eNB 102's egress point, between the media independent interface and physical layers, the packet management module 264 replaces the timestamp in the packet's correction field with the calculated residence time, and then recalculates the checksum of the packet so that the packet will show a valid checksum value.

A ToP packet transmitted over a transparent hop such as that discussed above will provide accurate clock data based on the data provided by the grandmaster 106, no matter what delays are experienced by the packet over the wireless hop, or what timing variations affect the wireless hop. The reason for this is that the ToP packet will carry residence time information based on a reliable time difference between the packet's entry into the wireless hop and the packet's exit from the wireless hop. All delays, including retransmissions, will be accurately accounted for in the residence time information.

For example, suppose that the packet fails the checksum operation at the eNB 102. The eNB 102 will discard the packet and will not send an acknowledgement to the eNB 118. The eNB 118 may then re-send the packet. However, the eNB 118 need not, and typically will not, include a timestamp reflecting the time of re-sending, because this is not relevant information with respect to the packet's residence time over the wireless hop. The relevant time is the time of arrival of the packet at the ingress of the eNB 118, and a timestamp reflecting this time can be inserted into the correction field of the packet. This procedure can be repeated if transmission fails again, and when the packet does finally arrive at the eNB 102, the calculated residence time will reflect the elapsed time between the arrival of the packet at the ingress of the eNB 118 and the transmission of the packet from the egress of the eNB 102.

Numerous alternative approaches may be employed without deviating from the spirit of the invention. For example, if it is determined that the wireless link over the channel 120 is relatively stable in terms of latency and jitter, an average residence time can be used for correction. If the link begins to exhibit greater instability, the residence time can be calculated for each packet.

Figure 3:
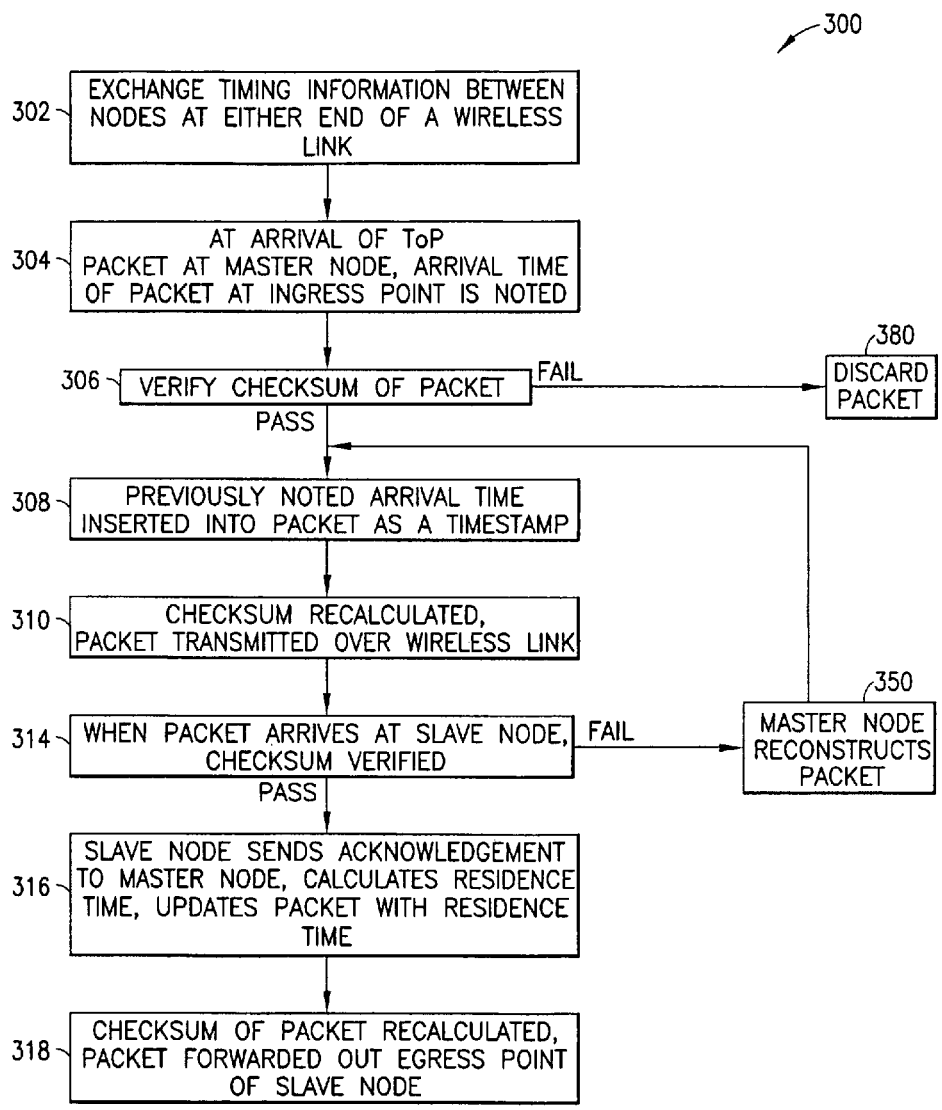
FIG. 3 illustrates a process according to an embodiment of the present invention.

FIG. 3 illustrates the steps of a process 300 of ToP clock distribution over a wireless link according to an embodiment of the present invention. At step 302, timing information is exchanged between nodes at either end of a wireless link, using a synchronization channel. The wireless link may be thought of as a transparent hop, with a node at one side of the transparent hop being thought of as a transparent hop master and a node at the other side of the transparent hop being thought of as a transparent hop slave. At step 304, upon receipt of a ToP packet at a master node, the arrival time of the packet at the ingress point, for example, between the media independent interface layer and the physical layer is noted. At step 306, the checksum of the packet is verified. If the checksum operation fails, the process skips to step 380 and the packet is discarded. If the checksum operation passes, the process proceeds to step 308 and the previously noted arrival time is inserted into the packet as a timestamp, suitably in a correction field of the packet. At step 310, the checksum is recalculated and the ToP packet is transmitted over the wireless link to the slave node. At step 314, when the ToP packet is received at the slave node, the checksum of the packet is verified. If the checksum fails, the process skips to step 350. If the checksum passes, the process proceeds to step 316, the slave node sends an acknowledgement to the master node, and the packet's residence time in the wireless link is calculated, suitably by taking the difference between the current time shown on a clock of the slave node and the timestamp shown in the packet's correction field is replaced by the calculated residence time of the packet. At step 318, the checksum of the packet is recalculated and the packet is forwarded out the egress point of the slave node.

At step 350, upon failing to receive an acknowledgement from the slave node, the master node reconstructs the packet. The process then returns to step 308, so that the original arrival time of the packet is stored as a timestamp.

Various modifications and adaptations to the foregoing exemplary embodiments of this invention may become apparent to those skilled in the relevant arts in view of the foregoing description. While various exemplary embodiments have been described above it should be appreciated that the practice of the invention is not limited to the exemplary embodiments shown and discussed here. For example, the transparent hop master is represented here as a macro eNB and the transparent hop slave is represented as a pico eNB, but it will be recognized that the particular configurations of the elements representing the ends of the wireless link are exemplary only and that the use of the present invention is not limited to any particular configuration of elements.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof

I claim:

1. An apparatus comprising:
   at least one processor;
   a computer readable memory storing a program of instructions;
   wherein the program of instructions is configured to, with the memory and the at least one processor, cause the apparatus to perform actions comprising at least:
   exchanging first timing information with a device with which the apparatus communicates over a wireless link, wherein the first timing information is exchanged over a synchronization channel with the device; and wherein the first timing information allows maintaining essentially the same time between the apparatus and the device;
   upon receiving a timing-over-packet packet from the device, wherein the timing-over-packet packet originates at a master with second timing information, passing the packet to an egress point of the apparatus;
   calculating a residence time of the packet in the wireless link, wherein the residence time represents a difference between a time represented by a timestamp of the packet and a time shown by a clock of the apparatus when the packet reaches the egress point of the apparatus, wherein the timestamp represents an arrival time of the packet at an ingress point of the device and wherein the timestamp of the packet is stored in a correction field of the packet;
   updating the timestamp of the packet with the residence time of the packet, wherein updating the timestamp of the packet comprises updating the correction field of the packet;
   recalculating a checksum of the packet; and
   transmitting the packet out of the egress point of the apparatus to a second device.

2. The apparatus of claim 1, wherein the actions further comprise verifying the checksum of the packet.

3. The apparatus of claim 1, wherein the egress point of the packet is between a media independent interface layer and a physical layer of the apparatus.

4. The apparatus of claim 1, wherein the synchronization channel is a dedicated channel.

5. The apparatus of claim 1, wherein the synchronization channel is a virtual channel in a radio bearer used for the wireless link.

6. A method comprising:
configuring at least one processor to cause an apparatus to perform actions comprising at least:
exchanging first timing information with a device with which the apparatus communicates over a wireless link, wherein the first timing information is exchanged over a synchronization channel with the device; and wherein the first timing information allows maintaining essentially the same time between the apparatus and the device;
upon receiving a timing-over-packet packet from the device, wherein the packet originates at a master with second timing information, passing the packet to an egress point of the apparatus;
calculating a residence time of the packet in the wireless link, wherein the residence time represents a difference between a time represented by a timestamp of the packet and a time shown by a clock of the apparatus when the packet reaches the egress point of the apparatus, wherein the timestamp represents an arrival time of the packet at an ingress point of the device, wherein the timestamp of the packet is stored in a correction field of the packet;
updating the timestamp of the packet with the residence time of the packet, wherein updating the timestamp comprises updating the correction field of the packet;
recalculating a checksum of the packet; and
transmitting the packet out of the egress point of the apparatus to a second device.

7. The method of claim 6, wherein the actions further comprise verifying the checksum of the packet.

8. The method of claim 6, wherein the egress point of the packet is between a media independent interface layer and a physical layer of the apparatus.

9. A non-transitory computer readable medium storing a program of instructions, execution of which by a processor configures an apparatus to perform actions comprising at least:

exchanging first timing information with a device with which the apparatus communicates over a wireless link, wherein the first timing information is exchanged over a synchronization channel with the device; and wherein the first timing information allows maintaining essentially the same time between the apparatus and the device;
upon receiving a timing-over-packet packet from the device, wherein the packet originates at a master with second timing information, passing the packet to an egress point of the apparatus;
calculating a residence time of the packet in the wireless link, wherein the residence time represents a difference between a time represented by a timestamp of the packet and a time shown by a clock of the apparatus when the packet reaches the egress point of the apparatus, wherein the timestamp represents an arrival time of the packet at an ingress point of the device, wherein the timestamp of the packet is stored in a correction field of the packet;
updating the timestamp of the packet with the residence time of the packet, wherein updating the timestamp of the packet comprises updating the correction field of the packet;
recalculating a checksum of the packet; and
transmitting the packet out of the egress point of the apparatus to a second device.

10. The computer readable medium of claim 9, wherein the actions further comprise verifying the checksum of the packet.

11. The computer readable medium of claim 9, wherein the egress point of the packet is between a media independent interface layer and a physical layer of the apparatus.

* * * * *